United States Patent [19]

Futhey

[11] 4,115,931
[45] Sep. 26, 1978

[54] INDIVIDUALIZED TEACHING SYSTEM UTILIZING ELECTRICAL CONTINUITY

[76] Inventor: John A. Futhey, P.O. Box 32, Petrolia, Calif. 95558

[21] Appl. No.: 721,538

[22] Filed: Sep. 8, 1976

[51] Int. Cl.² ................................................ G09B 7/06
[52] U.S. Cl. ........................................ 35/9 C; 35/9 B
[58] Field of Search ................. 35/8 R, 9 R, 9 B, 9 C, 35/48 A, 8, 9, 48; 40/52 R; 340/280, 366; 361/352, 410, 416

[56] References Cited

U.S. PATENT DOCUMENTS

| | | | |
|---|---|---|---|
| 2,586,710 | 2/1952 | Pick | 35/9 C |
| 2,790,251 | 4/1957 | Rhoten | 35/9 C |
| 3,077,511 | 2/1963 | Bohrer et al. | 361/416 X |
| 3,106,784 | 10/1963 | Raley | 35/9 C |
| 3,290,756 | 12/1966 | Dreyer | 361/416 X |
| 3,675,241 | 7/1972 | Glaser | 35/9 B X |
| 3,710,371 | 1/1973 | Whalen et al. | 340/280 X |
| 3,818,279 | 6/1974 | Seeger et al. | 361/416 X |
| 3,818,610 | 6/1974 | Baba et al. | 35/9 C |
| 3,835,553 | 9/1974 | Kirton et al. | 35/9 C |
| 3,973,334 | 8/1976 | Sterritt | 35/9 C X |

Primary Examiner—Vance Y. Hum
Attorney, Agent, or Firm—David B. Harrison

[57] ABSTRACT

An improvement in the system for educational and entertainment purposes in which the user is afforded an opportunity to select a correct answer for a question from among a plurality of possible answers is disclosed. The improvement includes a composite laminated card of insulated material with a plurality of arranged electrically conductive paths between sets of contacts, one set being for a hand held indicator probe and the other set for contact with a finger. The indicator probe has a conductive probe tip for contact with the card and the conductive contact with the user's hand holding the probe. The visual indicator in the probe indicates the presence of a continuity path extending from the probe through the card through the user's finger in contact with the finger contact, through the user's body and again to the probe. Very low voltage and currents are employed to implement the probe for use with body resistance. The card is so constructed that the teacher may individually program the card or the cards may be mass programmed at the factory.

4 Claims, 13 Drawing Figures

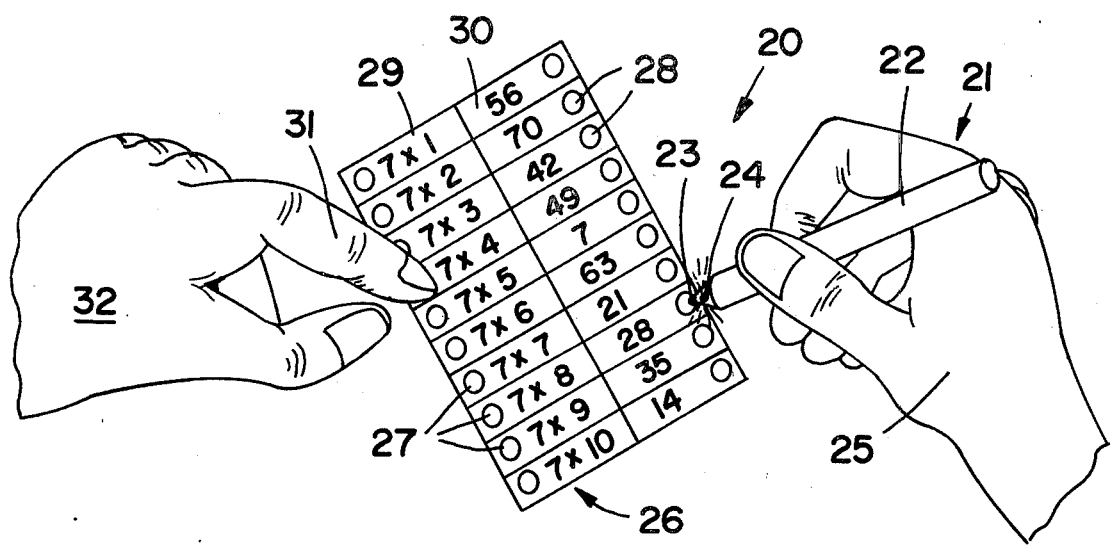
FIG_1
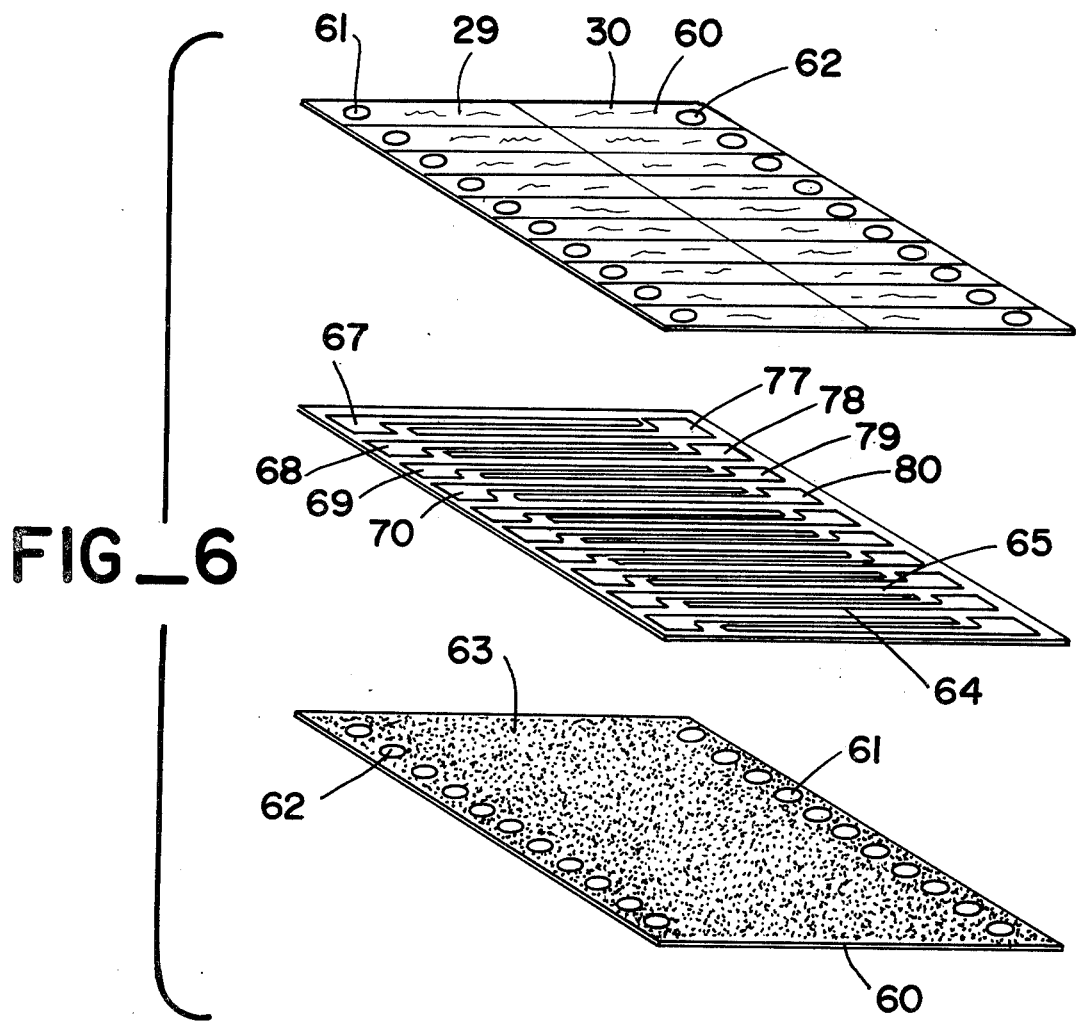
FIG_6

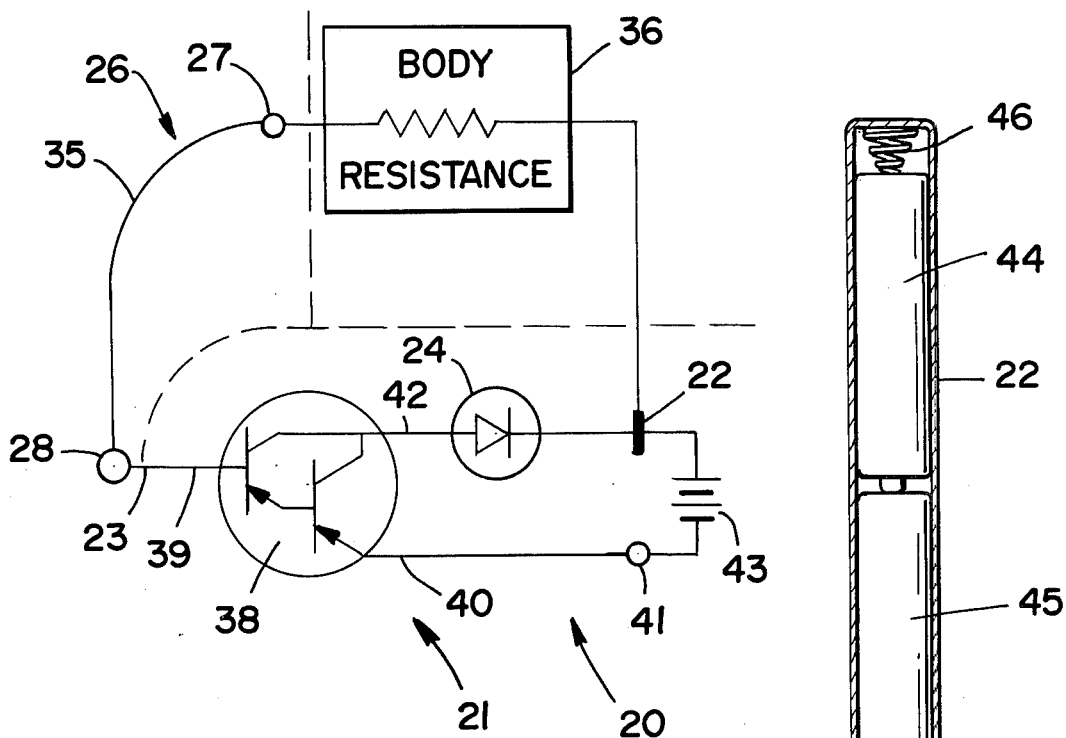
FIG_2
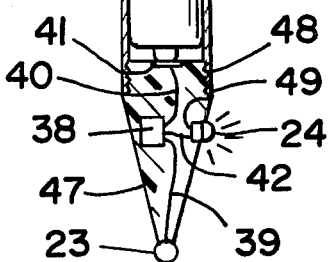
FIG_3
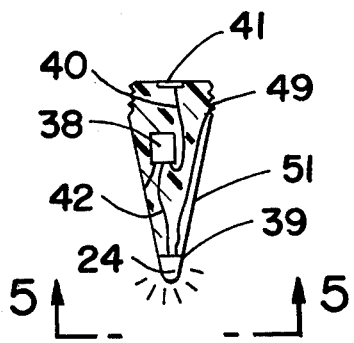
FIG_4
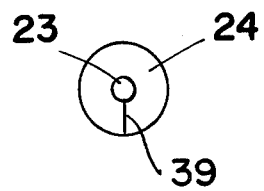
FIG_5

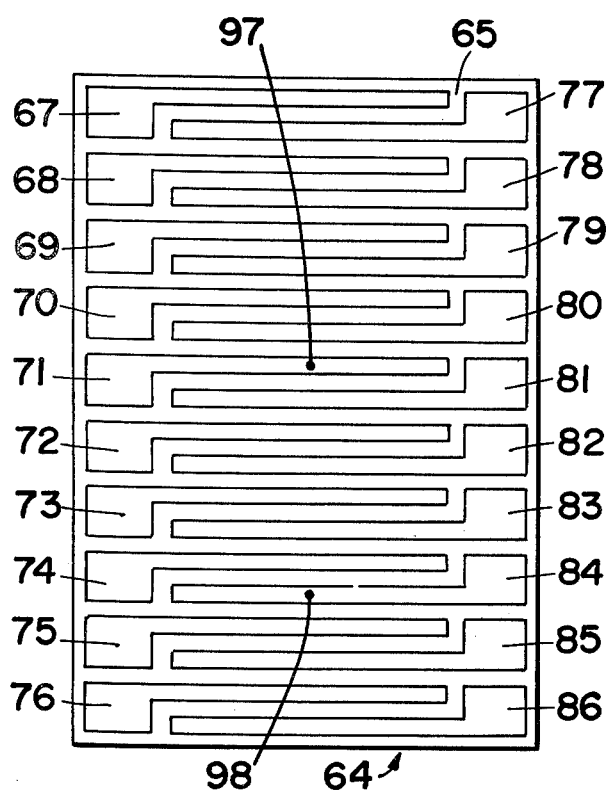
FIG_8
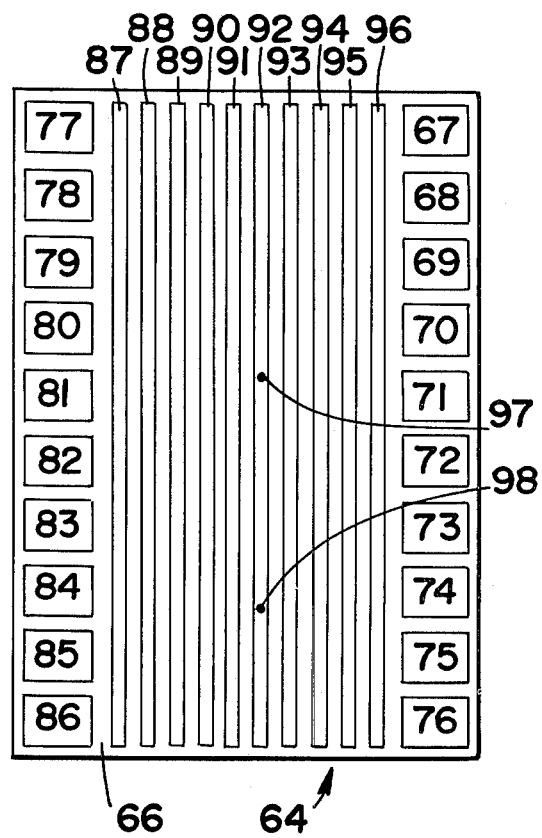
FIG_9
| 29 | 30 |
|---|---|
| 7 x 1 | 56 |
| 7 x 2 | 70 |
| 7 x 3 | 42 |
| 7 x 4 | 49 |
| 7 x 5 | 7 |
| 7 x 6 | 63 |
| 7 x 7 | 21 |
| 7 x 8 | 35 |
| 7 x 9 | 28 |
| 7 x 10 | 14 |
FIG_7

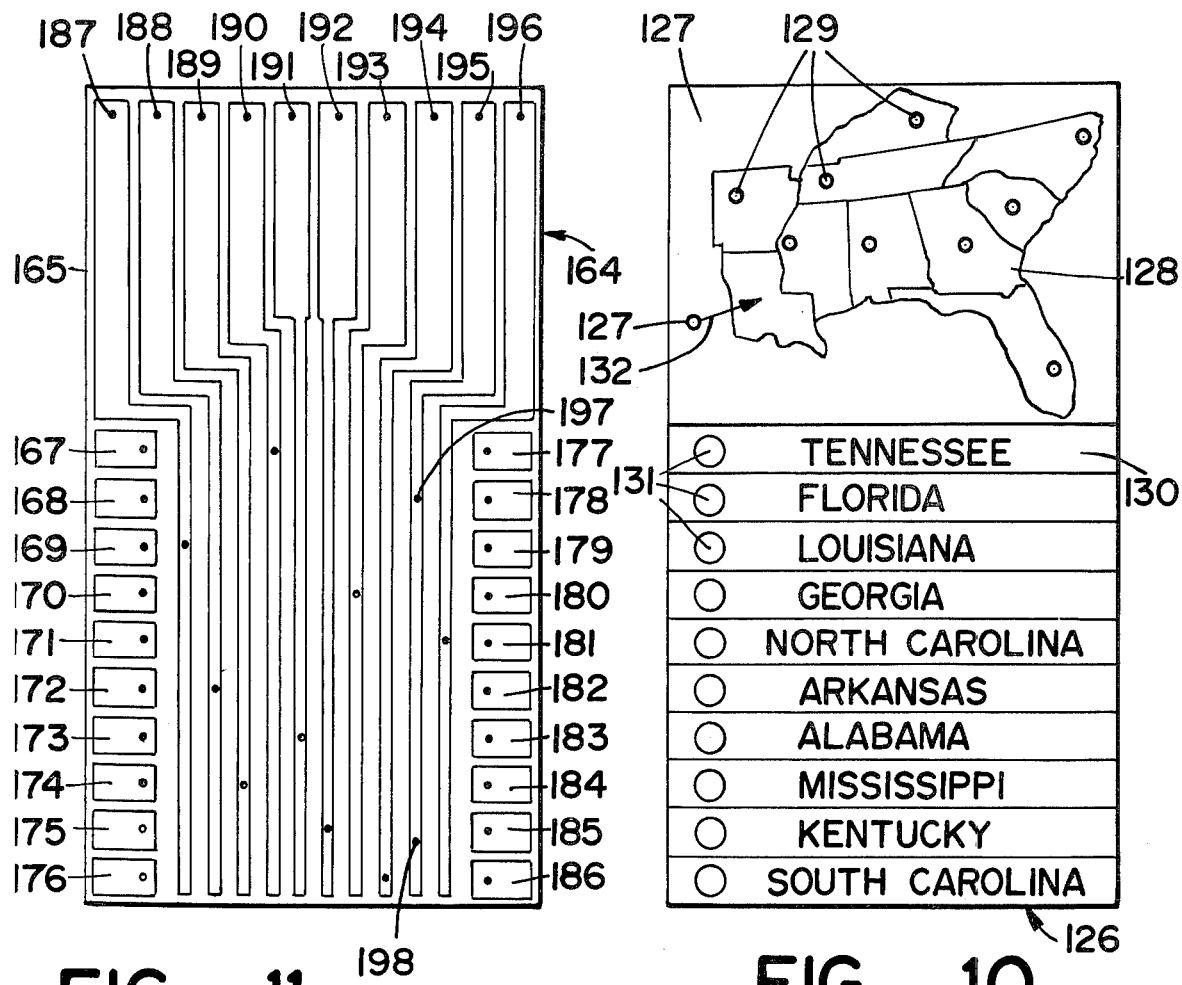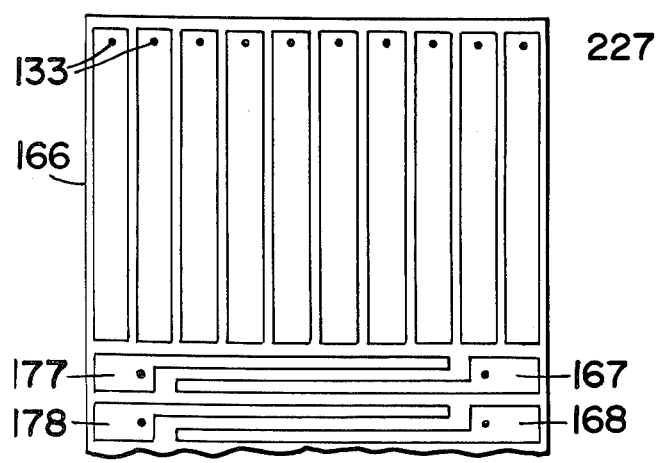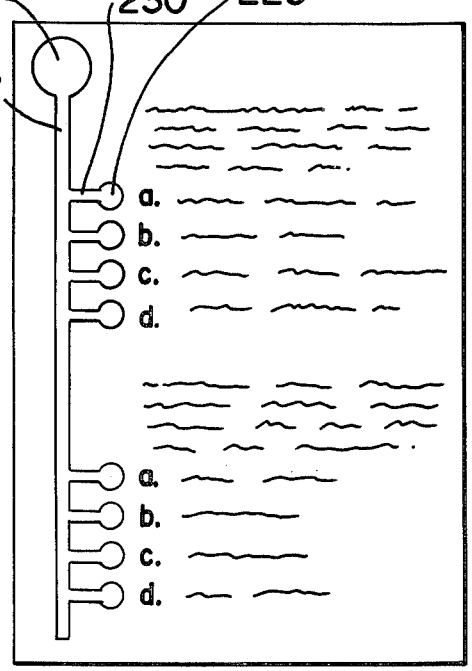

INDIVIDUALIZED TEACHING SYSTEM UTILIZING ELECTRICAL CONTINUITY

BACKGROUND OF THE INVENTION

This invention relates to an instructional system and more particularly to a system utilizing the combination of an improved information card having invisible continuity paths between plural pairs of contact pads, and an improved hand held cordless continuity indicator probe for use with the card, wherein a continuity indication may signal a correct answer to the user.

Educational devices utilizing an electrical continuity indicator circuit in conjunction with a matching or multiple choice matrix having invisible continuity paths have been known and used in education and in other fields for some time. Such devices typically had encumbering and inconvenient electrical circuitry and typically were physically quite large and thus not suitable for individual use by each student simultaneously in the classroom. Also, those devices were not mass produced and were necessarily expensive and therefore unavailable for widespread educational uses, thus limiting their effectiveness. In addition, most such devices were not easily portable, and were not suitable for carrying by students between home and class.

Because the prior art educational devices had a pre-wired fixed matrix board, students were easily able (and therefore inclined) to learn the pattern of the corresponding circuitry rather than profit through learning from the instructional material correlated to the matrix. While some of the prior art education devices allowed a change of matrix circuitry, those devices required the instructor to make such alterations.

SUMMARY OF THE INVENTION

An object of the present invention is to provide an instructional system employing one of a series of cards or pages bearing graphic information which is correlated with contacts connected by invisible conductive paths on the card, and a hand held indicator probe for use with the card to signal a correct answer to the user.

Another object of the present invention is to utilize effectively and safely the continuity of the user's body with one finger of one hand touching a contact of the card and the other hand holding the indicator probe, thereby eliminating all connection wires and rendering the probe truly wireless.

A further object of the present invention is to provide the cards with circuit paths printed with electrically conductive ink to eliminate wires and other metallized paths otherwise difficult to make and subject to breakage in use.

Another object of the present invention is to provide an improved card which may be readily reproduced with a variety of conductive path arrangements so that the variety inhibits the user from learning the pattern rather than the factual content of the card.

Another object of the present invention is to provide a card with contacts and contact paths which may be readily interconnected by the teacher to provide a still greater variety of conductive path patterns and thereby further inhibit the user from memorizing the pattern.

Yet another object of the present invention is to provide an improved indicator probe which is easily carried in the user's pocket, which is sturdy, durable, which has no movable parts, which uses a very low voltage dry cell power supply, and which has an exceptionally small standby current drain, thus insuring long periods of use without need of replacement of the dry cell.

A still further object of the present invention is to provide an improved educational system which is attractive, and easily used by operators of all ages in connection with an unlimited variety of subject matter.

Yet a further object of the present invention is to provide a vastly improved individualized teaching system using electrical continuity which is very inexpensive to make and maintain and which therefore may be made readily available to many people for many purposes.

The foregoing objects and others are accomplished by an improved teaching system utilizing in combination with the electrical continuity of the user, a completely self contained wireless hand held indicator probe and a special card bearing plural information or space for insertion of such information by the teacher, with each unit of information being related to two electrical contact points by conductive paths which are invisible to the user. In use, the user places the probe in one hand and places the finger of the other hand on a finger contact of the card and then places the probe into the correlated probe contact of the card which causes an electrical circuit to be completed, with a visual indicator in the probe to become illuminated thereby indicating a correlation: e.g., a correct answer.

Other objects, advantages, and features of the invention will become apparent from the following detailed description of embodiments presented in conjunction with the accompanying drawings.

BRIEF DESCRIPTION OF THE DRAWINGS

FIG. 1 is a view in perspective of a card and a probe constructed in accordance with the principles of the present invention with the forefinger of a left hand of the operator in contact with a finger contact of the card and the probe being grasped in the right hand of the operator and held in contact with a probe contact of the card which is electrically interconnected by an invisible conductive trace with the finger contact being touched by the user with the result that the probe indicator light is illuminated. The arms are broken off to save drawing room.

FIG. 2 is an electrical schematic circuit diagram of the system shown in FIG. 1.

FIG. 3 is a sectional plan view of the indicator probe element of the system shown in FIG. 1.

FIG. 4 is a partial plan view in section of an alternate form of probe tip useable with the present invention.

FIG. 5 is an enlarged frontal view of a portion of the tip shown in FIG. 4, along the line 5—5.

FIG. 6 is an exploded view of the laminar card construction of the card shown in FIG. 1.

FIG. 7 is a front view of the major surface of the top layer of the laminar card shown in FIG. 1.

FIG. 8 is a plan view of a front major surface of the middle layer of the card shown in FIG. 1.

FIG. 9 is a plan view of the rear major surface of the central layer of the card shown in FIG. 1.

FIG. 10 is a plan view of the major front surface of an alternate embodiment of laminar card constructed in accordance with the principles of the present invention.

FIG. 11 is a plan view of the front major surface of the central layer of the card which is shown in FIG. 10.

FIG. 12 is a plan view of the bottom major surface of the central portion of the card which is shown in FIG. 10.

FIG. 13 is a plan view of the alternative card embodiment incorporating the principles of the present invention.

DESCRIPTION OF THE PREFERRED EMBODIMENTS

With reference to FIG. 1, a teaching system 20 is illustrated. The system includes a hand held wireless indicator probe 21 having a pen-like conductive tube 22 containing batteries (not shown), a conductive sensor tip 23 and a visual indicator light 24. The probe 21 is preferably held in a right hand 25 of a user in the manner commonly afforded to writing implements.

The system 20 also includes a laminar card construction 26. The card 26 may be provided on its left margin with a series of finger contacts 27 of conductive material, and on its right margin with an arranged series of probe contacts 28. The left margin finger contacts 27 are preferably the same size as the right margin probe contacts so that left handed users may be accommodated as well as right handed users. Each finger contact 27 is electrically connected by a conductive trace (not shown) in FIG. 1 to a predetermined probe contact 28. Thus, the card 26 enables a first column 29 of data to be located adjacent the finger contacts 27 and a second column 30 of data, each of which is related to data in the first column 29 to be located adjacent the probe contacts 28. In this way the card 26 affords the user an opportunity to match one datum of the first column 29 with a corresponding datum of the second column 30, in the traditional manner of education or gaming arrangements known as "match up". In use, the user places the forefinger 31 of the left hand 32 into contact with one of the finger contacts 27. Then, the user brings the conductive probe end 23 into electrical contact with the particular probe contact 28 which is connected via the invisible conductive path to the finger contact 27 touched by the user's forefinger 31. When this occurs the visual indicator light 24 becomes illumined by virtue of detecting a completed high resistance, low current conductive path which extends through the user's body and through the card 26.

The Probe 21, FIGS. 2, 3, 4 and 5

The schematic circuit diagram of the system 20 is presented in FIG. 2. Therein, the system 20 is divided into three parts: the indicator probe 21, the card 26 having a conductive path 35 between the selected finger contact 27 and its corresponding probe contact 28, and the conductive path through the body shown as a body resistance element 36 extending from the conductive tube 22 to the finger contact 27 of the card 26. Turning now to the circuitry of the probe, a PNP Darlington transistor 38 is shown with a base 39 connected to the conductive tip 23, an emitter 40 connected to a battery terminal 41, and a collector 42 connected to an anode of the diode light 24, the cathode thereof being connected to the conductive battery case 22. Within the battery case is a battery 43 which may be two size AAA penlight cells 44 and 45 in tandem (shown in FIG. 3). The Darlington amplifier transistor 38 has a very high input impedance and very high gain so that it detects minute current through the body 36 and through the conductive connection 35 from the battery 43 to the tip 23. That minute current is sufficient to cause the base 39 to conduct which thereupon presents a low resistance path from the battery 43 to the diode light 24 and causes the light to become illuminated.

The sectional view in FIG. 3 of the probe 21 illustrates the preferred construction of the probe. I have found that a battery tube of the type commonly utilized for penlights works well as the tube 22. It is typically constructed of a plated brass or copper but it could be constructed of any material having a conductive outer surface. Within the tube, a spring 46 is placed between an end wall and the negative end of the battery 44. The positive end of the battery 45 is in contact with the battery terminal 41 which is part of a removable probe tip 47 which engages the tube 22 at a threaded end 48 thereof. In this manner, the probe tip 47 may be removed from the tube 22 to enable inspection and replacement of the cells 44 and 45. Also, it enables the probe tip 47 to be replaced sould that need ever arise. The tip 47 is provided with a conductive threaded portion 49 to which the cathode of the diode light 24 is connected so that a cathode of the diode light 24 is in electrical contact with the tube 22 and thus with the negative terminal of the battery 43.

FIG. 4 shows an alternate probe tip 51 which is interchangeable with the probe tip 47. In the probe tip 51 the diode light 24 is mounted at the apex of the tip 51, and the probe contact 23 is formed as a small conductive dot at the center outer surface of the light 24. The dot 23 is connected by the base lead 39 to the Darlington amplifier transistor 38. With the probe tip 41, the diode light appears at the point of contact between the probe 21 and the card 26, the point of expected focus of the user's eyes.

The probe tips 47 and 51 are easily formed by connecting the diode light 24, the Darlington amplifier transistor 38, the contact 41, the conductor threads 49 and the probe tip 23 together and then placing them in a mold in their final positions and then filling the mold with a hard curing epoxy resin or a thermoplastic which is preferably light opaque.

Programmed Card 26, FIGS. 6, 7, 8, 9

Referring now to FIGS. 6-9, the details of the card 26 are shown. The exploded view of FIG. 6 shows the card 26 to be of composite laminar construction with identically formed outer sheets 60 provided with holes 61 for the finger contacts 27, holes 62 for the probe contacts 28 and the printed information in columns 29 and 30. Of course the printed data 29 and 30 could vary from card to card to avoid repetition, or it could be the same so that an entire class of students could be provided with identical cards during a given lesson. The inner major surface of the outer sheets 60 is provided preferably with a pressure sensitive adhesive coating 63. Before the card 26 is assembled as a composite construction, the sheets 60 will be provided with release paper (not shown) in contact with the adhesive coating 63. Just prior to assembly of card 26, the release paper would be peeled from the sheets 60 and then the sheets would be applied in proper alignment over the major surfaces of an inner sheet 64.

The inner sheet 64 is preferably of a film of high dielectric plastic. In practice I have found that either films of polyolefin and white styrene work well as the sheet 64. Each sheet 64 provides the finger contacts 27, the probe contacts 28 or the ultimately invisible interconnections. The card 64 therefore must be of a material to which a conductive ink may be applied and adhered. I have experimentally determined that a formula of a conductive ink having suitable viscosity is as follows: 3 parts of Universal Color Dispersions product No. 1601Q for each part of Hybrid Electronics product No. CH211. Universal Color Dispersions is a subsidiary of Bee Chemical Company at 2700 East 170th Street, Lansing, Ill. and Hybrid Electronics is at 770 Airport Boulevard, Burlingame, Calif. The conductive regions may be applied by silk screening or by other printing processes.

The inner plastic card 64 may be made as a user programmable structure as follows: each card is provided with a series of, e.g., 20 conductive regions on one side 65 and 20 conductive paths separated by 10 longitudinal strips on the other side 66. The conductive regions on the side 65 are divided into 10 left edge regions 67, 68, 69, 70, 71, 72, 73, 74, 75, 76 and 10 right edge regions 77, 78, 79, 80, 81, 82, 83, 84, 85, 86. Each region includes a slender interior portion which extends across the card 64 to a point adjacently spaced apart from an opposite region. It is important that the slender parts traverse at least that portion of the width of the card 64 occupied by the longitudinal strips on the reverse side 66 thereof. Each conductive region of the side 65 is electrically connected with the pad on the reverse side 66 thereof which has been given the same reference numeral. During construction and before printing, the card may be additionally perforated at each pad location so that the conductive ink is free to flow through the card, in the event that the pads on the reverse side 66 are intended for use.

The marginal portions of the conductive regions 67 through 86 are located to register with the holes 61 and 62 of the outer sheets 60 to provide the finger contacts 27 and the probe contacts 28.

Programming of the card 64 is easily accomplished. For example, should the teacher desire to connect the conductive region 71 with the opposite conductive region 84, a first pinhole 97 is made through the card 64 at a location where the inner conductive region 71 crosses the longitudinal strip 92 and a second pinhole 98 is made through the interior part of the conductive region into the same longitudinal strip 92. Then, a drop of conductive ink is applied to the pinholes 97 and 98 to connect the regions 71, 92 and 84. In like manner, the remaining conductive regions may be programmed into a wide variety of different patterns. After the programming has been completed and the drops of conductive ink have dried, the card 26 is assembled by peeling the release paper from the adhesive surface of each outer sheet 60 and then pressing it in proper alignment against the inner sheet 64 to form the completed composite laminar card 26.

Program Card 126, FIGS. 10, 11 and 12

The program card 126 shown in FIGS. 10, 11 and 12 is a modification and extension of the principles of the card illustrated in FIGS. 6, 7, 8 and 9. The card 126 provides a pictorial portion 127 at the top thereof with a suitable picture 128 having multiple parts with each part having a probe contact 129. Below the picture portion 127 of the card 126 appears a data portion 130 where multiple data are listed with each adjacent a finger contact 131. The user places a finger over the first listed datum finger contact and then touches the probe 22 to the probe contact of that portion of the picture 128 which corresponds with the datum adjacently opposite the contacted finger contact.

The cards 126 may be constructed as composite laminar constructions in the same manner as has already been described for the cards 26. An inner card 164 has one surface 165 provided with 20 marginal pads 167 through 186 in the same manner as with the card 126. The side 165 also includes 10 vertical portions which, unlike the card 126, have widened regions in the top portion 127 of the card. The 10 regions 187–196 underlie the graphic region of the card and provide the probe contacts 129. In the event that the pictorial information 128 has components which do not overlie all of the broadened regions of the vertical strips 187–196, a lead line 132 may extend from the probe contact 127 to the part of the picture to which the probe contact relates as shown in FIG. 10.

The reverse side 166 of the inner card 164 is shown in FIG. 12 and is similar to the side 65 shown in FIG. 8 in connection with card 26 save only that in the picture portion of the card 126, the reverse side 166 is provided with plural conductive regions 187–196 which are electrically connected with the regions having the same reference numerals on the other side 165. Electrical interconnection of corresponding vertical strips is accomplished through holes 133 through which conductive ink flows.

The programming of the card 126 is accomplished in the same manner already described in connection with the card 26. Pinholes 197 and 198 are made through the card 164 at predetermined points along the vertical conductive strip 195. In the case of the card 126, only one hole need be made to connect the region 195 to any of the marginal pads 167–186. Two or more pinholes may be utilized to connect the region 195 with more than one marginal pad. In this way, the same picture portion might relate to two separate data in the text portion 130 of the card 126. Again, a drop of conductive ink would be placed through the pinhole 197 and allowed to dry. Then the card would be assembled in the manner described in connection with the card 26 to provide a composite programmed card.

Card 226, FIG. 13

A somewhat different form of programmed card is shown in FIG. 13. Therein the card 226 is formed of a single sheet of nonconductive material such as white frosted styrene. Along the left margin of the card 226 extends a vertical conductive strip 227 having a finger contact region 228 preferably at the top thereof so that the card may be held by placement of the forefinger of the left hand on the contact 228 and the thumb of the left hand on a lower portion of the left margin of the card 226. Extending into the conductive strip 227 are multiple series of dots with each dot providing a probe contact 229. Each probe contact 229 is connected to the vertical strip 227 by a region 230. However, in each series of probe contacts 229, only one of the bridges 230 is of conductive ink and the remaining bridges are of an identically appearing nonconductive ink. Thus, the card may be programmed simply by painting bridges 230 from the probe contacts 229 to the vertical strip 227, with some of the bridges conductive and others nonconductive. In this fashion multiple choice type examinations are easily provided to a learner.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. A device for education, amusement and the like comprising:

three sheets interfacially bound together into a laminated card with the outermost two faces thereof each having two columns for plural pairs of informational items with one of each pair being in a first column and the other in a second column;

adjacent to each said item, an opening through said outer card providing access to a face of an inner card, said inner card being made of electrically nonconductive material and having adhered on one face of said inner card a plurality of unconnected vertically arrayed electrically conductive ink strips, and on the other face of said inner card a plurality of unconnected horizontally arrayed electrically conductive ink strips, the number of said horizontal strips being twice the number of said vertical strips, each horizontal strip alternatively terminating in enlarged ink deposits positioned adjacent to the left edge and the right edge of said inner card and aligned with one of the aforementioned perforations in the outer sheets, preselected horizontal strips being electrically connected to preselected vertical strips via small apertures through said inner card, said apertures being filled with electrically conductive ink, said apertures being positioned in accordance with the placement of the informational items or spaces heretofore described and in such a manner that exists a plurality of distinct continuity paths from the said ink deposits adjacent to one edge of said inner card to corresponding ink deposits adjacent to the other edge of said card, said continuity paths being defined by the positions of the inked perforations, and accessibility to said continuity paths being through the perforations in the outer cards;

a hand held wireless indicator probe having a conductive probe tip enabling the user to make contact between said tip and a said enlarged ink deposit of said card, a hand contact enabling electrical contact between said probe and the user's hand which is holding the probe, visual indicator means in said probe for indicating to the user the occurrence of a completed electrical continuity circuit loop, low voltage battery power supply means in said probe connected for powering said visual indicator means, switch means connected between said battery and said indicator for switching on said indicator, switch control means connected between said hand contact and said probe contact into said switch means, said switch control means responsive to minute electrical current flow through a loop including the user's body and finger held in contact with an ink deposit being connected by a said continuity path to said ink deposit in which said probe tip is in contact, and said probe tip in electrical contact with said ink deposit, said switch control means thereupon activating said switch means and thereby eliminating said visual indicator means of said probe.

2. The improved system set forth in claim 1 wherein said visual indicator means comprises a light emitting diode and said switch means as well as said switch control means comprise a Darlington connected transistor pair wherein a base connection provides said switch control means and a circuit from emitter to collector provides said switch means.

3. The improved system set forth in claim 1 wherein said card includes a plurality of finger contacts with each said finger contact being connected to a said probe contact in accordance with an invisible pattern of prearranged electrical connection paths.

4. A device in accordance with claim 1 wherein that face of the said inner card to which said vertical ink strips are adhered has adjacent to its left and right edges conductive inked regions insulated from said vertical strips and electrically connected through ink filled apertures, to the similar inked regions on the other face of said inner card, whereby information may be contained on both the front and back face of the finished composite card and the same continuity circuits thereof thus serve both the front face and the back face thereof.

* * * * *